United States Patent
Robaidek

(10) Patent No.: US 11,384,323 B2
(45) Date of Patent: Jul. 12, 2022

(54) METHOD OF MAKING SPARKLING BEVERAGE WITH REDUCED CARBON FOOTPRINT

(71) Applicant: Wisconsin Alumni Research Foundation, Madison, WI (US)

(72) Inventor: Jerrold Odilon Robaidek, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 541 days.

(21) Appl. No.: 16/534,745

(22) Filed: Aug. 7, 2019

(65) Prior Publication Data

US 2021/0040423 A1 Feb. 11, 2021

(51) Int. Cl.
*C12G 1/06* (2019.01)

(52) U.S. Cl.
CPC ..................... *C12G 1/06* (2013.01)

(58) Field of Classification Search
CPC ....................................................... C12G 1/06
See application file for complete search history.

(56) References Cited

U.S. PATENT DOCUMENTS

| 2,513,813 | A | * | 7/1950 | Milleville | A23F 3/426 |
| | | | | | 426/429 |
| 3,526,509 | A | * | 9/1970 | Komoda | A23L 27/24 |
| | | | | | 426/429 |
| 3,852,477 | A | * | 12/1974 | Venter | C12F 3/04 |
| | | | | | 426/11 |
| 11,168,292 | B2 | * | 11/2021 | Jones | C12G 3/02 |
| 2016/0003532 | A1 | | 1/2016 | Young et al. | |

FOREIGN PATENT DOCUMENTS

CN   108660009   * 10/2018

OTHER PUBLICATIONS

English Translation for CN108660009 published Oct. 2018.*

* cited by examiner

*Primary Examiner* — Anthony J Weier
(74) *Attorney, Agent, or Firm* — Boyle Fredrickson, S.C.

(57) ABSTRACT

A method of enhancing the aroma of a wine or beverage conducts flavorful volatiles from a separately occurring fermentation process as driven by the expressed carbon dioxide of the fermentation process. As well as capturing flavorful volatiles that would otherwise be lost, the process "recycles" carbon dioxide reducing the released carbon dioxide for a given quantity of produced sparkling beverage.

20 Claims, 3 Drawing Sheets

METHOD OF MAKING SPARKLING BEVERAGE WITH REDUCED CARBON FOOTPRINT

STATEMENT REGARDING FEDERALLY SPONSORED RESEARCH OR DEVELOPMENT

Not Applicable

CROSS REFERENCE TO RELATED APPLICATION

Not Applicable

BACKGROUND OF THE INVENTION

The present invention relates to the manufacture of effervescent beverages and in particular to a method of making an effervescent beverage having wine aromatics conveyed together with carbon dioxide from a generating wine fermentation.

Traditionally, wine is made by fermenting the juice of grapes using yeast, a process which converts the sugar in the grape juice into alcohol and carbon dioxide.

For "still" wines, the carbon dioxide produced in the fermentation process is vented to the atmosphere; however, for "sparkling" wines, this carbon dioxide is retained by sealing the fermentation container. Retained under pressure, the carbon dioxide carbonates the wine by dissolving into the wine to be released as bubbles when the wine is dispensed.

In the traditional champagne method (méthode champenoise) various wines are fermented into a dry wine, and then is often combined into a cuvée. A second fermentation is used to produce the carbonation, starting when additional yeast and sugar are added to the bottle. A similar second fermentation is used in the "charmat" method where the additional yeast and sugar are added to a base wine contained in a tank to generate the carbonation. More affordable carbonated wines may be created by using an external source of food grade carbon dioxide to carbonate an otherwise still wine.

An important aspect of any wine is its aroma which is recognized as an important part of its perceived taste, in part because of the limitation of the tongue to distinguish flavors compared to the ability of the nose and the olfactory bulb. The aroma, as distinguished from the bouquet, is largely determined by the grape variety.

SUMMARY OF THE INVENTION

The present invention provides a method of enhancing the aroma of a wine or beverage by conducting aromatics from a separately occurring fermentation driven by the expressed carbon dioxide of separate primary fermentation. As well as capturing flavorful volatiles that would otherwise be lost, the process essentially "recycles" carbon dioxide of the separate fermentation reducing the released carbon dioxide for a given quantity of sparkling beverage.

In one embodiment, the invention provides a method of making a sparkling beverage by fermenting grape juice in a first sealed tank to provide a pressurized source of carbon dioxide and flavorful volatiles from the fermenting grape juice. This first tank communicates the carbon dioxide and flavorful volatiles from the fermenting grape juice to a second sealed tank holding a beverage liquid, by means of a conduit communicating between the first tank and second tank. At the conclusion of this process, fermented wine and carbonated beverage are transferred into separate pressurized containers for transportation to consumers.

It is thus a feature of at least one embodiment of the invention to capture the flavorful volatiles and carbon dioxide of a generating fermentation in a second beverage to augment the aroma and effervescence of that second beverage.

The first sealed tank and second sealed tank may have a pressure in excess of 20 psi and in some cases in excess of 40 psi.

It is thus a feature of at least one embodiment of the invention to use the energy of fermentation to pressurize the carbon dioxide for efficient incorporation into the still beverage.

The first sealed tank may connect to the conduit to communicate with a headspace above a level of the fermenting grape juice.

It is thus a feature of at least one embodiment of the invention to provide for a transfer of flavorful volatiles without mixing of the fermenting grape juice and second beverage. This is particularly useful for the production of aroma-enhanced effervescent water because it avoids transfer of significant amounts of alcohol and fermentable product.

The second sealed tank may connect to the conduit at a dip tube passing downward into the beverage liquid and terminating at a carbonation stone.

It is thus a feature of at least one embodiment of the invention to rapidly reach equilibrium between gaseous and dissolved carbon dioxide and flavorful volatiles for efficient commercial production.

The second beverage liquid may be a still wine.

It is thus a feature of at least one embodiment of the invention to provide novel new types of sparkling wine having a rich palette of aromas obtained from different fermentations.

In one embodiment the grape juice may be juice from a champagne varietal.

It is thus a feature of at least one embodiment of the invention to provide a champagne-like sparkling wine from the generating fermentation.

The method may use champagne yeast resistant to pressures in excess of 50 psi.

It is thus a feature of at least one embodiment of the invention to permit the generation of higher pressures during the fermentation for the purpose of aroma and carbon dioxide transfer without adversely affecting the yeast.

The second beverage liquid may be water.

It is thus a feature of at least one embodiment of the invention to provide a new type of sparkling water having wine-like aroma.

The water may have a pH of less than four.

It is thus a feature of at least one embodiment of the invention to provide improved shelf stability through antimicrobial pH levels.

The first sealed container may have a volume of less than one third of the second sealed container.

It is thus a feature of at least one embodiment of the invention to take advantage of the large amounts of carbon dioxide expressed during the fermentation process to create larger volumes of effervescent beverages by providing improved recycling of carbon dioxide and reduced carbon dioxide generation per volume of effervescent liquid produced.

The headspace may be at least ten percent of the volume of the first sealed container.

It is thus a feature of at least one embodiment of the invention to reduce transfer of liquid between the containers and to provide a buffer zone to stabilize pressure fluctuations.

After an initial transfer of flavorful volatiles and carbon dioxide, the method may close the conduit and vent additional carbon dioxide from the first sealed container to prevent the transfer of yeast reductive or other undesirable aromas.

It is thus a feature of at least one embodiment of the invention to permit control of aromatic transfer through timing of conduit closure.

The fermenting grape juice may be pre-treated with nutrients to limit the formation of hydrogen sulfide.

It is thus a feature of at least one embodiment of the invention to reduce transfer of undesirable volatiles that normally would be vented to the atmosphere.

The beverage liquid is maintained at a temperature below 65 degrees Fahrenheit, or in some cases, below 40 degrees Fahrenheit.

It is thus a feature of at least one embodiment of the invention to provide carbonation at lower pressures through the reduction of liquid temperature in the target tank such as improves carbon dioxide solubility.

The conduit may equalize the pressure between the first sealed tank and the second sealed tank.

It is thus a feature of at least one embodiment of the invention to provide a simple transfer method that maintains the pressure in the fermentation container at no more than is necessary for proper carbonation.

The method may provide a partial fermentation of the grape juice at atmospheric pressure.

It is thus a feature of at least one embodiment of the invention to allow independent control of early-stage fermentation without concerns for high pressure or closed systems.

These particular objects and advantages may apply to only some embodiments falling within the claims and thus do not define the scope of the invention.

DETAILED DESCRIPTION OF THE PREFERRED EMBODIMENT

Figure 1:
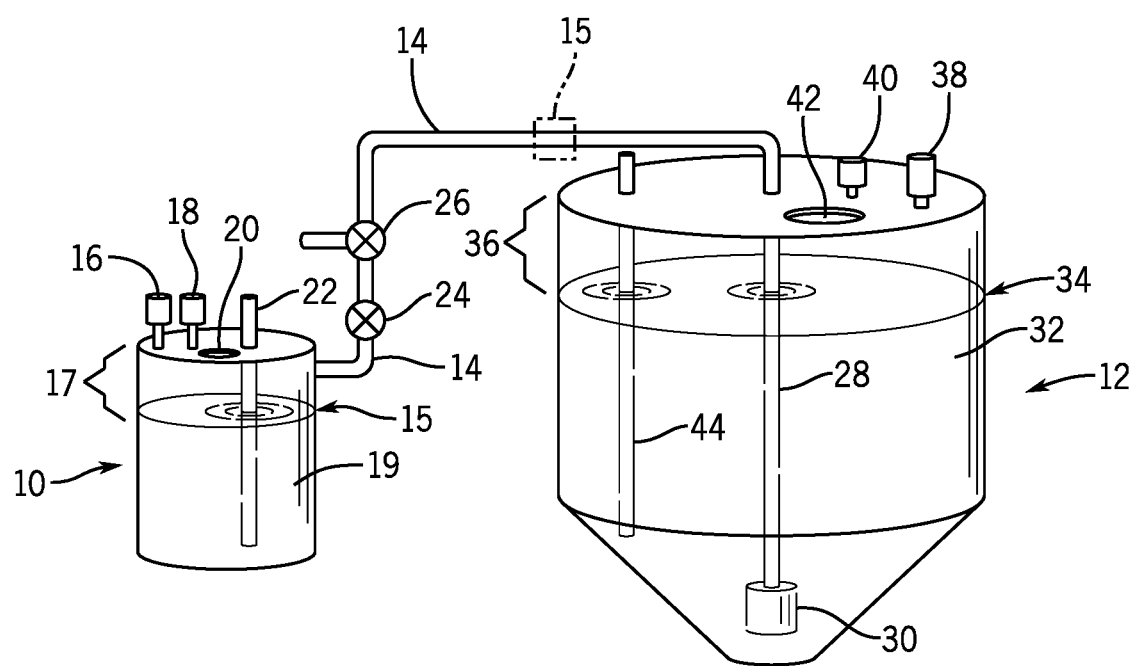
FIG. 1 is a simplified system diagram of interconnected tanks, the latter depicted in phantom, showing internal and external conduits as used for the practice of the present inventive method.

Referring now to FIG. 1, the present invention, in one embodiment, may employ a fermentation tank 10 coupled to a carbonation tank 12 by means of a conduit 14.

The fermentation tank 10, for example, may be a 75-gallon stainless steel tank and in one embodiment may be capable of holding a pressure of 100 psi or more. In use, the fermentation tank 10 will be filled to no higher than a fill level 15 to provide a headspace 17 above a contained must 19 (unfermented grape juice).

The fermentation tank 10 may include an overpressure valve 16 communicating with the headspace 17 to release carbon dioxide pressure at a safe level below the pressure limits of the tank (for example, 90 psi) and a spurge valve 18 also communicating with the headspace 17 that may be controllably set, for example, from between 15 and 90 psi to provide fine pressure control during the inventive process. A sealable access port 20 may be provided above the headspace 17 for access to the fermentation tank 10, for example, for the introduction of must 19 or cleaning of the fermentation tank 10 after use.

One or more dip tubes 22 are provided to allow withdrawal of must 19 from the fermentation tank 10. For this purpose one dip tube 22 may extend deeply into the fermentation tank 10 to open proximate to the bottom of the fermentation tank 10 to allow complete material removal while a second dip tube 22 (not shown) may be spaced slightly above the bottom of the fermentation tank 10 to allow removal of liquid without sediment.

The headspace 17 of the fermentation tank 10 may also communicate with a transfer conduit 14 through a shut off valve 24, implemented either as a valve or by means of a valving disconnect connector between the fermentation tank 10 and the conduit 14. The transfer conduit 14 may also connect with a bypass valve 26 allowing venting of gases from the headspace 17 into the atmosphere in one position and in a second position communication of those gases through the conduit 14 to the carbonation tank 12. An optional volatile filter 15 may be placed in series with the conduit to permit selective passage of volatiles between the fermentation tank 10 and the carbonation tank 12. Possible filters include for example activated charcoal.

The carbonation tank 12 may be of similar construction to the fermentation tank 10, for example, being constructed of stainless steel and in one embodiment may have a pressure rating of at least 100 psi. At the carbonation tank 12, the conduit 14 may extend by means of a dip tube 28 to a location proximate to the bottom of the carbonation tank 12 where the dip tube 28 connects to a carbonation stone 30 being a porous stone that serves to break up gas passing through the carbonation stone 30 into tiny bubbles that will be introduced into a still beverage 32 held in the carbonation tank 12. The bubbles serve to increase the contact area between the gas and the still beverage 32 to promote dissolving of that gas into the still beverage 32.

As with the fermentation tank 10, the carbonation tank 12 will be filled to a maximum fill level 34 to define a headspace 36 unoccupied by the still beverage 32. The headspace 36 may communicate with an overpressure valve 38 and spurge valve 40 operating similarly to valves 16 and 18 of the fermentation tank 10 and may provide a corresponding access port 42 as well as one or more dip tubes 44 which may pass down into the carbonation tank 12 to locations near its bottom to allow for the withdrawal of liquids as described above with respect to the fermentation tank 10.

Generally the headspace 17 and 36 will be at least 10 percent of the total volume of the respective tanks 10 and 12 and typically more than 20 percent to provide for improved pressure stability and to prevent the transfer of liquids between these tanks by the conduit 14.

The present inventor has recognized that the flavorful volatiles and carbon dioxide produced by fermentation in the fermentation tank 10 in the production of a sparkling wine far exceed the amount needed for carbonation of the volume of must 19 in the fermentation tank 10 and accordingly the carbonation tank 12 may be much larger than the fermentation tank 10, for example, as much as 8 to 10 times larger (when a still wine is being carbonated) and more than 20 times (when water is being carbonated) and in all cases at least two times larger. By transferring not only the flavorful volatiles from the fermentation tank 10 to the carbonation tank 12 but also carbon dioxide, the present invention provides for capturing of substantial amounts of carbon dioxide and flavorful volatiles that would otherwise be lost. This effect of reducing carbon dioxide release is most pronounced when the still beverage is water but a similar reduction in carbon dioxide is obtained when carbonating a still wine as the still beverage 32 because the secondary fermentation or external dioxide otherwise required for sparkling wine processes is eliminated. Using an independent fermentation to provide carbon dioxide to the still beverage 32 when the still beverage is a still wine also provides greater flexibility in the fermentation of the still wine including selection of yeast and other process steps which fundamentally affect the character of the product produced. This method of producing a sparkling wine also permits a more natural wine fermentation using, for example, wild yeast, no added nutrients, no filtering and no sulfites. As noted, there is no need for a wild yeast strain that can handle higher alcohol or high pressures associated with conventional sparkling wine production.

Figure 2:
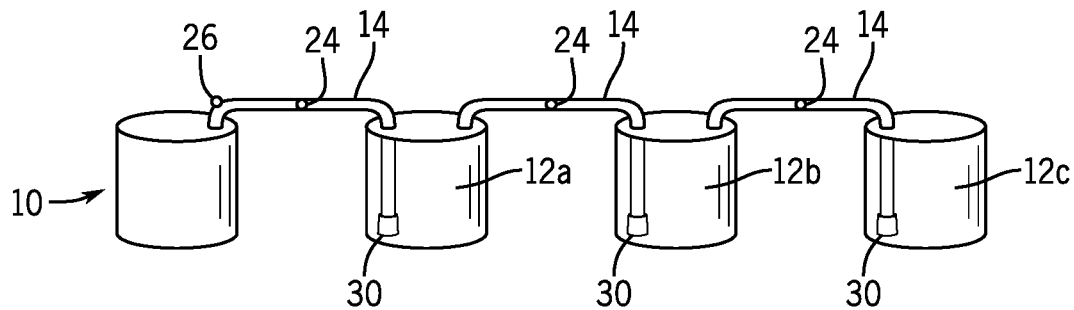
FIG. 2 is a simplified representation of an alternative tank system that may also be used with the present invention.

Referring to FIG. 2, in an alternative configuration, the fermentation tank 10 may be connected either in parallel or in series (as shown) to multiple carbonation tanks 12a-12c in a daisy chain fashion. When a parallel connection is used, the multiple carbonation tanks 12a-12c effectively operate as the carbonation tank 12 shown in FIG. 1, but with the volume divided among multiple tanks. Differences in the carbonation process in each of the multiple carbonation tanks 12a-12c can be controlled, however by controlling the timing of the opening of the shut off valves 24.

When a series connection is used, the series connection may provide for different degrees of carbonation and aromatic transfer in the successive multiple carbonation tanks 12a-12c both because of the absorption provided in the earlier tanks and also through control of the shut off valves 24 between each tank. In the series configuration, conduits 14 between each tank may remain open simultaneously or maybe opened in stages. The fermentation tank 10 and carbonation tanks 12a-12c may otherwise be similar to those described with respect to FIG. 1.

As will be discussed in greater detail below, generally, the present invention provides a natural fermentation of a sparkling wine in fermentation tank 10 which is used to provide flavorful volatiles and carbon dioxide to the carbonation tank(s) 12 to create a sparkling beverage in the carbonation tank(s). The sparkling beverage may be either a sparkling wine from a previously fermented still wine or sparkling water. This process will be termed herein "Pétillant Nouveau Vie" roughly translating to "bubbly new life" reflecting the present invention's ability to recycle carbon dioxide used for the production of bubbles.

Figure 3:
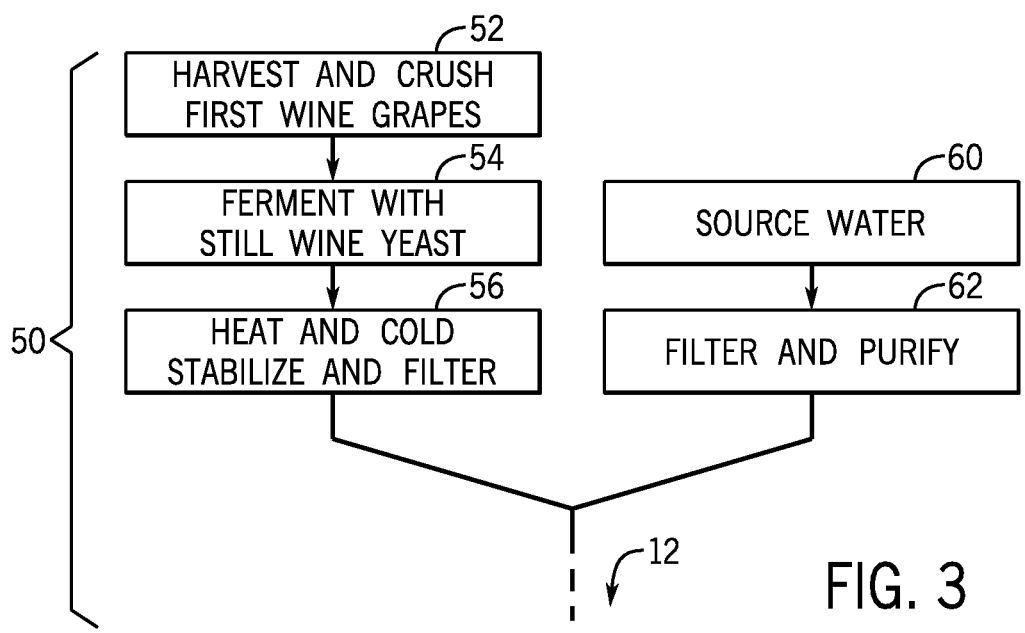
FIG. 3 is a flowchart for the production of a beverage that will be carbonated and aroma enhanced per the present invention.

Referring now to FIG. 3, in a first stage 50 of the pétillant a "still" (non-effervescent) beverage 32 will be prepared for introduction into a carbonation tank 12 (shown in FIG. 1). When a still wine is used as the still beverage, harvested grapes are crushed as indicated by process block 52 and fermented per process block 54 typically using a yeast for still wine fermentation having no particular qualities of resistance to high pressure or the environment created during a closed vessel fermentation. In one embodiment the source grapes may be La Crosse hybrid cultivars although the present invention is not limited to any particular grape variety or single variety. During this process some amounts of carbon dioxide and flavorful volatiles are vented to the atmosphere to limit the pressure in the fermentation vessel to atmospheric pressure.

At process block 56, after the fermentation is complete, the still wine may be heat stabilized and cold stabilized, filtered, and subjected to additional polishing according to well-understood techniques. As is understood in the art, heat stabilization helps remove proteins that make the wine cloudy when it warms up and cold stabilization reduces tartaric acids that can crystallize when the wine is chilled. Filtration can be used to remove yeast and sediment, and additional polishing may be performed by adding sugar, liquors, flavors from oak and the like.

Alternatively, as indicated by process block 60, when an aromatic infused effervescent water is desired, water from a water source may be obtained and filtered and purified as indicated by process block 62, for example, to reduce mineral content and any contaminating bacteria. The still beverage 32 may then be placed into the carbonation tank 12.

Figure 4:
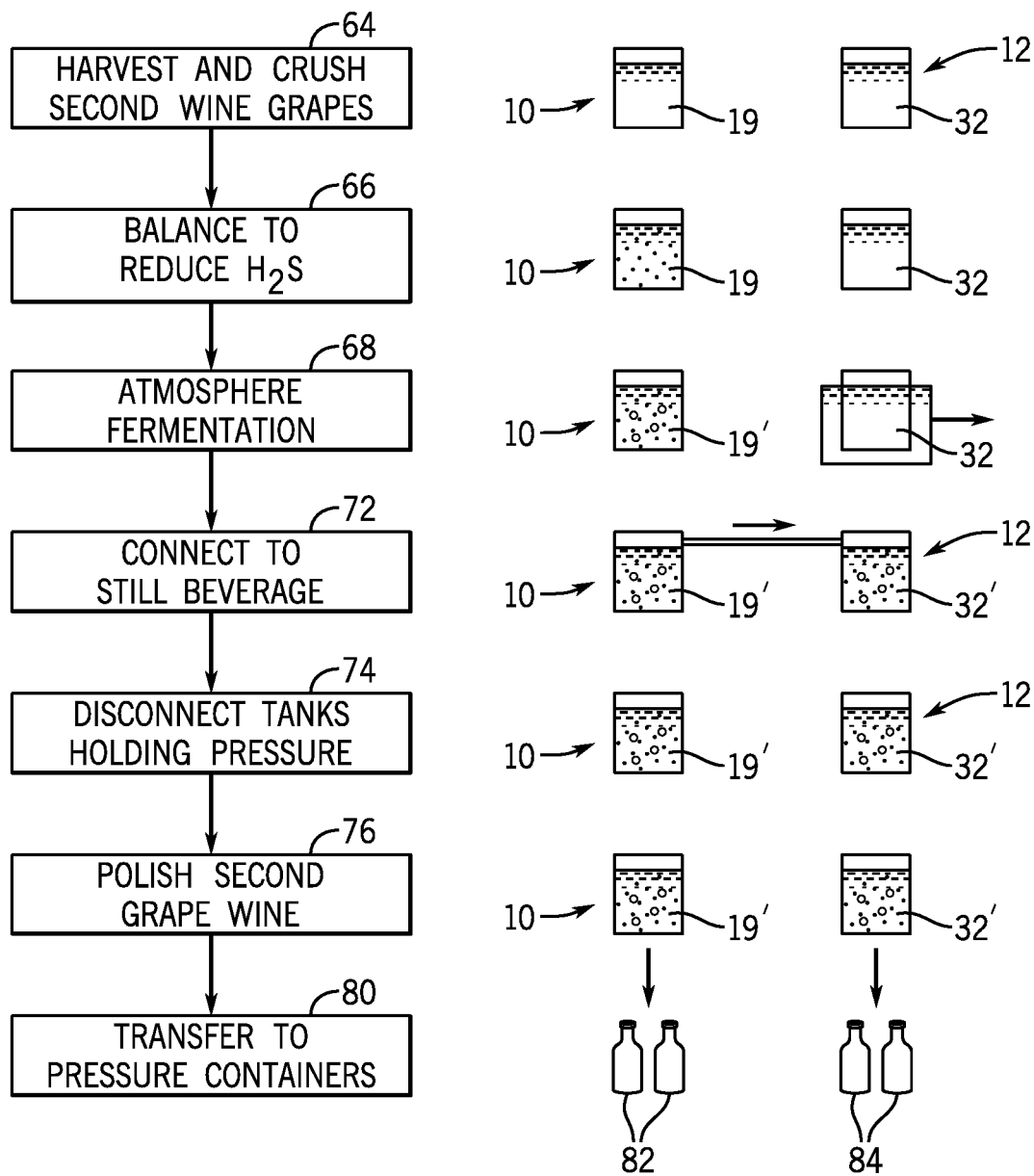
FIG. 4 is a parallel flowchart and process diagram showing the steps of carbonation and aromatic transfer in the present invention using a generating fermentation.

Referring now to FIG. 4, the beverage 32 may then be placed into the carbonation tank 12 and, as indicated by process block 64, a harvesting and crushing of a second wine grape may be performed to provide the must 19 placed in the fermentation tank 10.

As indicated by process block 66, the must 19 may be balanced with respect to nutrients to reduce the formation of hydrogen sulfide during the fermentation process. This is important because the hydrogen sulfide will flow with the carbon dioxide and flavorful volatiles to possibly create an off aroma in the beverage 32. This nutrient balance may, for example, be done by analyzing the must 19 and providing a commercially available nutrient supplement such as Opti-White, Fermaid O, or Fermaid K, yeast nutrients commercially available from Scott laboratories, Inc. of California, USA. The analysis, for example may perform a YAN test (Yeast Assimilable Nitrogen). This test measures a combination of Free Amino Nitrogen (FAN), ammonia (NH3), and ammonium (NH4+) available for the wine yeast to use during fermentation. Adequate nitrogen helps prevent the development of off-odors. A minimum requirement of YAN may be approximately 150 mg/and a maximum YAN of 400 mg/L to prevent boosting other organisms.

At process block 68 fermentation of the must 19 is conducted with the carbonation tank 12 open to the atmosphere (for example, using bypass valve 26 shown in FIG. 1) to provide a more conducive environment for fermentation. In some embodiments, a champagne yeast resistant to high pressures will be used for this process although the invention is not limited to such yeasts. This fermentation may continue until the sugar content of the must has dropped by 2-3 Brix from its initial state. In one embodiment of the invention, only one to two percent of the sugar of the must 19 is required to provide sufficient carbonation of an equal volume of liquid in the carbonation tank 12. This fermentation may be temperature controlled or allowed to conduct itself at ambient temperatures or in a range of 60 to 65 degrees Fahrenheit.

During this time, optionally, the beverage 32 may be chilled, for example, by a cooling jacket 70. By cooling the beverage 32, carbonation may be incorporated at a lower pressures which may be desirable, for example, in the production of an effervescent water can be bottled at lower pressures of on the order of 22 psi or lower With the fermentation of the must 19 still continuing at process block 72, the fermentation tank 10 may be connected to the carbonation tank 12 by the conduit 14 as discussed above. This connection provides for the transfer of flavorful volatiles and carbon dioxide to the beverage 32 on a contemporaneous basis in which the transfer occurs in less than 10 minutes of transit time and typically less than a minute. This contemporaneous transfer presents loss or precipitation of flavorful volatiles.

At process block 74 the fermentation tank 10 and carbonation tank 12 may be disconnected, for example, by closing shut-off valve 24 shown in FIG. 1 or removing the conduit 14. This disconnection may wait until fermentation in the fermentation tank 10 is essentially complete or may be terminated immediately therebefore to prevent the transfer of yeast rest aromas that occur near the end of the fermentation. At process block 76, the must 19, now turned into a sparkling wine 19', may be treated as discussed above with respect to process block 56 including, for example, a racking process where the wine is separated from the lees (autolyzed yeast and other solids).

At process block 80 sparkling wine 19' may be packaged in pressurized containers 82 and sparkling wine 32' packets in pressurized containers 84 for shipment to the consumer. Desirably the still beverage 32 is now sparkling wine 32' and will have a total acidity of around nine grams per liter or in a range of 6 to 13 grams per liter. It is believed a sparkling water produced by this process will also have a slightly acidic pH.

The invention contemplates that it may be used to create a sparkling "natural" wine. Natural wines add nothing to the grape juice and in particular do not add yeast, sulfites, nutrients, or fining materials. Creating a "natural" sparkling wine is difficult because it precludes use of a secondary fermentation. Using the present invention, about 10% of the grape juice could be reserved (and, for example, frozen) and the remaining grape juice fermented to produce a natural still wine. The reserved juice could then be fermented to produce the carbon dioxide to carbonate the natural wine as discussed above.

Generally the invention contemplates that other beverages may be infused with flavorful volatiles and carbonated by this technique including, for example, fruit juices.

The term "water" as used herein refers to substantially pure water free from discernible tastes and meeting the standards for bottled water as of the date of this filing promulgated by the US food and drug administration. Atmospheric pressure is considered to be 15 psi±five psi.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What I claim is:

1. A method of making a sparkling beverage comprising:
   (a) fermenting grape juice in a first sealed tank to provide a pressurized source of carbon dioxide and flavorful volatiles from the fermenting grape juice;
   (b) communicating the carbon dioxide and flavorful volatiles from the fermenting grape juice from the first tank to a second sealed tank holding a beverage liquid through a conduit communicating between the first tank and second tank to pressurize the second sealed tank to produce a carbonated beverage infused with the flavorful volatiles; and
   (c) transferring of the fermented grape juice and carbonated beverage into separate pressure holding containers for shipment to consumers.

2. The method of claim 1 wherein during step (b) the first sealed tank and second sealed tank have a pressure in excess of twenty pounds per square inch.

3. The method of claim 2 wherein during step (b) the first sealed tank and second sealed tank have a pressure of at least forty pounds per square inch.

4. The method of claim 1 wherein the first sealed tank connects to the conduit to communicate with a headspace above a level of the fermenting grape juice.

5. The method of claim 4 wherein the headspace is at least 10 percent of the volume of the first sealed container.

6. The method of claim 1 wherein the second sealed tank connects to the conduit at a dip tube passing downward into the beverage liquid and terminating at a carbonation block.

7. The method of claim 1 wherein the second beverage liquid is a still wine.

8. The method of claim 7 wherein the second beverage liquid is heat stabilized.

9. The method of claim 8 wherein the second beverage liquid is processed by at least one of cold stabilization and filtration.

10. The method of claim 1 wherein the grape juice is juice from a champagne varietal.

11. The method of claim 1 wherein step (a) uses a champagne yeast resistant to pressures in excess of 50 psi.

12. The method of claim 1 wherein the second beverage liquid is substantially pure water.

13. The method of claim 11 wherein the second beverage liquid water has a pH of less than four.

14. The method of claim 1 wherein the first sealed container has a volume of less than one third of the second sealed container.

15. The method of claim 1 further including the step after (b) closing the conduit and venting additional carbon dioxide from the first sealed container to prevent the transfer of yeast rest aromas.

16. The method of claim 1 wherein in the fermenting grape juice is treated with nutrients to limit a formation of hydrogen sulfide.

17. The method of claim 1 wherein the beverage liquid is maintained at a temperature below sixty-five degrees Fahrenheit.

18. The method of claim 17 wherein the beverage liquid is maintained at a temperature below forty degrees Fahrenheit.

19. The method of claim 1 wherein the conduit equalizes the pressure between the first sealed tank and the second sealed tank.

20. The method of claim 1 further including a partial fermentation of the grape juice at atmospheric pressure.

* * * * *